United States Patent
Rees et al.

(10) Patent No.: US 12,119,528 B2
(45) Date of Patent: Oct. 15, 2024

(54) FUEL CELL STACK ASSEMBLY

(71) Applicant: Ceres Intellectual Property Company Limited, Horsham (GB)

(72) Inventors: Lee Rees, Horsham (GB); Stephen Phillip, Horsham (GB); Euan Freeman, Horsham (GB); Andrew Ballard, Horsham (GB); Tomasz Domanski, Horsham (GB); Eren Erturk, Horsham (GB); Alan Robertson, Horsham (GB)

(73) Assignee: CERES INTELLECTUAL PROPERTY COMPANY LIMITED, Horsham (GB)

( * ) Notice: Subject to any disclaimer, the term of this patent is extended or adjusted under 35 U.S.C. 154(b) by 0 days.

(21) Appl. No.: 18/235,483

(22) Filed: Aug. 18, 2023

(65) Prior Publication Data

US 2024/0047726 A1 Feb. 8, 2024

Related U.S. Application Data

(63) Continuation of application No. 16/626,607, filed as application No. PCT/GB2018/051756 on Jun. 22, 2018, now Pat. No. 11,777,129.

(30) Foreign Application Priority Data

Jun. 26, 2017 (GB) .................................. 1710187

(51) Int. Cl.
*H01M 8/00* (2016.01)
*H01M 8/2425* (2016.01)
(Continued)

(52) U.S. Cl.
CPC ....... *H01M 8/2475* (2013.01); *H01M 8/2425* (2013.01); *H01M 2008/1293* (2013.01)

(58) Field of Classification Search
CPC .................................................. H01M 8/2475
See application file for complete search history.

(56) References Cited

U.S. PATENT DOCUMENTS 7,282,292 B2 10/2007 Cortright et al.
2003/0104260 A1 6/2003 Hill et al.
(Continued)

FOREIGN PATENT DOCUMENTS

DE 10 20 15 225 350 A1 6/2017
DE 10 2015 225 351 A1 6/2017
(Continued)

OTHER PUBLICATIONS

Yoshimine et al., Fuel Cell Stack, Oct. 2017, See the Abstract. (Year: 2017).*
(Continued)

*Primary Examiner* — Cynthia H Kelly
*Assistant Examiner* — Monique M Wills
(74) *Attorney, Agent, or Firm* — Potomac Law Group, PLLC

(57) ABSTRACT

The present invention is concerned with an improved fuel cell stack assembly comprising a metal base plate on which is mounted at least one fuel cell stack and a metal end plate, each stack comprising at least one fuel cell stack layer that comprises at least one fuel cell and at least one electrically insulating compression gasket, wherein a skirt is attached to the base and end plates enclosing the stack and is under tension therebetween so as to maintain a compressive force through the stack, thereby obviating the need for tie-bars.

18 Claims, 11 Drawing Sheets

(51) Int. Cl.
H01M 8/2475 (2016.01)
H01M 8/12 (2016.01)

(56) References Cited

U.S. PATENT DOCUMENTS

| | | |
|---|---|---|
| 2003/0203268 A1 | 10/2003 | Rock |
| 2009/0117416 A1 | 5/2009 | Suh |
| 2009/0162726 A1 | 6/2009 | Ozgur |
| 2011/0076585 A1 | 3/2011 | Edmonston et al. |
| 2011/0212380 A1 | 9/2011 | Andreas-Schott et al. |
| 2014/0141351 A1 | 5/2014 | Shinohara et al. |
| 2014/0234744 A1 | 8/2014 | Nielsen et al. |
| 2014/0255817 A1 | 9/2014 | Blanchet et al. |
| 2014/0255818 A1 | 9/2014 | Chinnici et al. |
| 2015/0118593 A1 | 4/2015 | Morimoto et al. |
| 2016/0133983 A1 | 5/2016 | Kobayashi et al. |
| 2018/0294453 A1 | 10/2018 | Hoefler et al. |
| 2018/0294503 A1 | 10/2018 | Hoefler et al. |

FOREIGN PATENT DOCUMENTS

| | | | | |
|---|---|---|---|---|
| EP | 1 909 349 B1 | | 5/2013 | |
| GB | 1356312 A | | 6/1974 | |
| GB | 2535242 A | | 8/2016 | |
| JP | H08-306373 A | | 11/1996 | |
| JP | 2002-050393 A | | 2/2002 | |
| JP | 2002-343410 A | | 11/2002 | |
| JP | 2006-049221 A | | 2/2006 | |
| JP | 2008-078148 A | | 4/2008 | |
| JP | 2009-525564 A | | 7/2009 | |
| JP | 2013-020886 A | | 1/2013 | |
| JP | 2017-508254 A | | 3/2017 | |
| JP | 2017183225 A | * | 10/2017 | ............. Y02E 60/50 |
| JP | 2019-503030 A | | 1/2019 | |
| KR | 101353839 B1 | | 1/2014 | |
| RU | 2414775 C1 | | 3/2011 | |
| RU | 147533 U1 | | 11/2014 | |
| RU | 2597873 C1 | | 9/2016 | |
| WO | 99/27602 A1 | | 6/1999 | |
| WO | WO 2015136295 A1 | | 3/2014 | |
| WO | WO 2014/168330 A1 | | 10/2014 | |

OTHER PUBLICATIONS

International Search Report for International Patent Application No. PCT/GB2018/051756, Aug. 3, 2018.
International Preliminary Report on Patentability for International Patent Application No. PCT/GB2018/051756, Dec. 31, 2019.
Search Report for GB Patent Application No. 1710187.4, Aug. 18, 2017.
Search Report and English Translation of Decision to Grant from Russian Patent Application No. 2020102869, Aug. 27, 2021.
Examination Report issued Feb. 8, 2022, in Indian Patent Application No. 202017001423.
Decision to Grant issued Mar. 7, 2022, in Japanese Patent Application No. 2019-571627.
Decision to Grant issued Jan. 30, 2023, in Japanese Patent Application No. 2022-056313.
Written Decision on Registration issued Jan. 27, 2023, in Korean Patent Application No. 10-2020-7001709.
Extended European Search Report issued Jul. 21, 2023, in European Patent Application No. 21169507.7.
Office Action issued Dec. 19, 2023, in Korean Patent Application No. 10-2023-7013801 (with English translation of Grounds for Rejection).
Office Action issued May 12, 2022, in Canadian Patent Application No. 3,067,956.
Office Action issued Oct. 13, 2023, in Canadian Patent Application No. 3,067,956.
Office Action issued Oct. 22, 2021, in Taiwanese Patent Application No. 107121517.
Office Action issued Jul. 25, 2024, in Chinese Patent Application No. 201880042840.0.

* cited by examiner

FUEL CELL STACK ASSEMBLY

SCOPE OF THE INVENTION

The present invention is concerned with improved fuel cell stack assembly arrangements, more particularly a fuel cell stack compression arrangement, and to methods of forming the same.

BACKGROUND OF THE INVENTION

Teachings of fuel cells, fuel cell stacks, fuel cell stack assemblies, and heat exchanger systems, arrangements and methods are well known to one of ordinary skill in the art, and in particular include WO02/35628, WO03/07582, WO2004/089848, WO2005/078843, WO2006/079800, WO2006/106334, WO2007/085863, WO2007/110587, WO2008/001119, WO2008/003976, WO2008/015461, WO2008/053213, WO2008/104760, WO2008/132493, WO2009/090419, WO2010/020797, WO2010/061190, WO2015/004419, WO2015/136295, WO2016/124929, WO2016/124928, WO2016/128721 and WO2016/083780. All publications referenced herein and their references are incorporated herein by reference in their entirety. Definition of terms used herein can be found as necessary in the above publications. In particular, the present invention seeks to improved the systems and methods disclosed in WO2015/136295.

Significant challenges in mechanical, electrical and thermal design are encountered when designing SOFC (solid oxide fuel cell) stacks, as the stacks are required to be in compression for electrical connectivity, gas sealing, and maintenance of structural integrity for assembly, movement and operation, undergo significant thermal cycling and need to maintain integrity over life time of operation.

Metal supported solid oxide fuel cell stack assemblies typically comprise a metal base plate, at least one solid oxide fuel cell stack mounted on the base plate, a metal end plate, each at least one fuel cell stack arranged mounted between said base plate and said end plate, and (each at least one fuel cell stack) comprising at least one fuel cell stack layer, each at least one fuel cell stack layer comprising at least one fuel cell and at least one electrically insulating compression gasket.

Each at least one fuel cell typically comprises anode, electrolyte and cathode layers supported on a metal substrate.

Such solid oxide fuel cell components of metal supported solid oxide fuel cell (SOFC) stack assemblies are often held in compression with the use of multiple tie-bars running from the base plate, through guide holes in the at least one fuel cell stack and through the end plate where they are secured with locking nuts.

Due to the proximity of the tie-bars to the edges of the guide holes (i.e. to the edges of the metal components which define the guide holes in the at least one fuel cell stack), careful design consideration is required as there is a risk of short circuit between the tie-bars and the stack when the components expand at high temperatures in potentially mixed atmosphere involving steam, reacted and unreacted hydrocarbons and air.

During manufacture of the fuel cell stack assembly, assembly bars (having a larger diameter than the tie-bars) are inserted through the guide holes in the at least one fuel cell stack to achieve alignment of the fuel cells whilst the stack is first assembled. The assembly bars are then removed and replaced with the tie-bars which have a smaller diameter than the assembly bars. The end plate is then added to the top of the at least one fuel cell stack, and compression means are used to compress the fuel cell stack assembly. With the fuel cell stack assembly compressed, locking nuts are then added. The compressive load is then removed from the stack, leaving the tie-bars to maintain the stack compression. Maintaining the compression load over the operating temperature range of the fuel cell stack can be a challenge depending on the compression load required, the number of fuel cell stack layers—and hence tie-bar length, and suitable materials to make the tie-bar from. Having to have tie-bars of differing design for different stack designs can add complexity and cost.

The present invention seeks to improve upon the prior art and/or address, overcome or mitigate at least one of the prior art disadvantages.

SUMMARY OF THE INVENTION

According to the present invention there is provided a method of forming a metal supported solid oxide fuel cell stack assembly comprising the steps of:
 (a) assembling:
  (i) a metal base plate;
  (ii) an at least one fuel cell stack mounted on the base plate; and
  (iii) a metal end plate;
  each at least one fuel cell stack arranged mounted between said base plate and said end plate, and comprising at least one fuel cell stack layer, each at least one fuel cell stack layer comprising at least one fuel cell and at least one electrically insulating compression gasket,
 (b) applying a compressive force through the at least one fuel cell stack using a compression means;
 (c) attaching a skirt to and between the base plate and the end plate to enclose the stack; and
 (d) removing the compression means so that the compressive load on the at least one fuel cell stack is maintained through tensile forces in the skirt.

By maintaining a compressive load on the at least one fuel cell stack through tensile forces in the skirt, the need for the presence of tie-bars is removed. Removal of the tie-bars results in a reduction of the thermal mass of the fuel cell stack assembly, which in turn increases the performance of the fuel cell stack assembly—in particular, it can reduce the energy required to get the at least one fuel cell up to operating temperature i.e. can reduce the time taken to reach operational temperature. This in turn can increase operating efficiency of the fuel cell stack assembly. This also results in a simplified manufacturing process, simplified components, and reduces the risk of short circuits occurring in the final product.

Preferably, the compressive force is applied to the base plate and the end plate. Preferably, the compressive force is applied through the base plate and the end plate.

Preferably, when the compression means is removed, the skirt is under tension to and between the base plate and the end plate to maintain the compressive load on the at least one fuel cell stack.

By not having guide holes for tie-bars in the at least one fuel cell stack, there is an increase in the available surface area of the metal substrate on which the anode, electrolyte and cathode layers can be placed, i.e. the at least one fuel cell can have a larger surface area and therefore power output can be increased.

Preferably, the skirt is a metal skirt. As described below, the (metal) skirt may be attached to the base plate and the end plate by welding.

Preferably, the skirt has a coefficient of thermal expansion greater than the coefficient of thermal expansion of the at least one fuel cell stack, the solid oxide fuel cell stack assembly additionally comprising at least one expansion plate located between the base plate and the end plate, the at least one expansion plate having a coefficient of thermal expansion greater than that of the skirt.

In certain embodiments, the fuel cell stack assembly comprises a plurality of expansion plates.

Preferably, the coefficient of thermal expansion is (i.e. is measured or defined as) a linear coefficient of thermal expansion (as opposed to an area expansion or volume expansion).

In conventional metal supported solid oxide fuel cell stack assemblies, the high temperatures under which the metal supported solid oxide fuel cell stack assembly operates cause the component parts to expand. The tie-bars are typically of metal construction and have a greater coefficient of thermal expansion (CTE) than other components of the at least one fuel cell stack, in particular the electrically insulating compression gaskets. In such assemblies, the result of this difference in the CTEs is that under working conditions (typically 450-800 Deg C., more typically about 450-650 Deg C.), expansion of the fuel cell stack assembly occurs, resulting in a reduction in the compressive force on the at least one fuel cell stack due to the greater expansion of the tie-bars relative to the other components of the fuel cell stack assembly, particularly the at least one solid oxide fuel cell stack. Even a small reduction in compressive force can cause a loss in gas sealing and lower electrical conductivity between fuel cell stack components, particularly fuel cell stack layers and adjacent components (e.g. other fuel cell stack layers, or electrical power take-offs). This in turn can reduce the working efficiency of the at least one fuel cell stack, and could ultimately result in failure of the at least one fuel cell stack.

The skirt is attached to the base plate and end plate, and thus thermal expansion of the base plate and end plate also affect the compressive force exerted upon the at least one fuel cell stack. Preferably, the coefficient of thermal expansion of the at least one expansion plate is greater than the coefficient of thermal expansion of the base plate and the coefficient of thermal expansion of the end plate. Preferably, the CTE of the skirt is greater than the overall CTE of the base plate, the at least one fuel cell stack, and the end plate (also referred to as their "total CTE" or "the CTE of the base plate, the at least one fuel cell stack, and the end plate"). More preferably, where reference is made to the overall CTE of the base plate, the at least one fuel cell stack, and the end plate, the resultant CTE is a function of length (or relative length) or the base plate, the end plate, and the at least one fuel cell stack. Moreover, preferably where length (or relative length) of the base plate and end plate is used to determine an overall CTE of the base plate, the at least one fuel cell stack and the end plate, the length of the base plate and the end plate is determined as the length of the base plate and end plate from an end of the base plate or end plate proximal to the at least one fuel cell stack and the point at which the skirt is attached to the base plate or end plate.

Preferably, an expansion plate is located between the end plate and an adjacent fuel cell stack layer. In certain embodiments, there is just one expansion plate. In other embodiments there are multiple expansion plates, for example a first expansion plate located between the base plate and an adjacent fuel cell stack layer, and a second expansion plate located between the end plate and an adjacent fuel cell stack layer. In certain embodiments, the fuel cell stack assembly comprises (in order) an end plate, a compression plate, an electrically insulating compression gasket, and the at least one fuel cell stack.

In certain embodiments, at least one expansion plate is located between fuel cell stack layers, for example in a central, centre or middle region of the fuel cell stack assembly.

Preferably, the coefficient of thermal expansion is a linear coefficient of thermal expansion along an axis defined between the base plate and the end plate and perpendicular to a general plane of the base plate and a general plane of the end plate.

Preferably, the skirt expands along a longitudinal direction (a longitudinal direction of expansion) defined between the base plate and the end plate and perpendicular to a general plane of the base plate and a general plane of the end plate. Preferably, such an expansion defines an enlarging length of the skirt along the longitudinal direction of expansion. Preferably, the at least one expansion plate defines an enlarging length along the longitudinal direction of expansion. Preferably, the enlarging length of the at least one expansion plate along the enlarging direction compensates for the enlarging length of the skirt along the enlarging direction. Preferably, the compensation is at a temperature between 450 and 650 Deg C. Preferably, the compensation is of at least 50% of the enlarging length of the skirt as compared to the enlarging length of the at least one fuel cell stack (or the enlarging length of the base plate, the at least one fuel cell stack, and the end plate). More preferably, the compensation is at least 60, 70, 80, 90 or 95%.

Preferably, an at least one expansion plate is located between first and second adjacent solid oxide fuel cell stack layers.

Preferably, an at least one expansion plate is located attached to the metal end plate.

Thus the expansion of the skirt is compensated for by the expansion of the at least one expansion plate, which in turn ensures that compressive load is maintained upon the at least one fuel cell stack, in turn helping maintain gas sealing and electrical conductivity between fuel cell stack components, particularly between adjacent fuel cell stack layers.

In conventional assemblies, the use of tie-bars to maintain stack compression loads (and thus fuel cell stack alignment) becomes more apparent for stacks with many layers, or larger active area fuel cells, where the compression loads or height of the stack (i.e. length of the stack, measured from the base plate to the end plate) means that the diameter and length of the tie-bars become difficult to manage from a stack assembly and compression load application basis.

Thus by both (a) removing tie-bars from the fuel cell stack assembly, and (b) incorporating an at least one expansion plate, the overall performance and lifespan of the fuel cell stack assembly is increased.

Preferably, the compressive load on the at least one fuel cell stack which is maintained by tensile forces in the skirt is a gasket sealing load, i.e. is sufficient to maintain a gas seal between each at least one electrically insulating compression gasket and the adjacent components, i.e. the current fuel cell stack layer and the adjacent component, e.g. another fuel cell stack layer, or a power take off plate (also referred to as a "current collector" or "end pole").

Preferably, each fuel cell stack layer comprises a metal substrate upon which is mounted an at least one fuel cell, a metal spacer layer, and a metal interconnect plate. Preferably, each at least one fuel cell comprises anode, electrolyte and cathode layers. Preferably, an oxidant flow path (i.e. a fluid flow path) is defined from an oxidant inlet to an exhaust oxidant outlet, and a fuel flow path (i.e. a fluid flow path) is defined from a fuel inlet to an exhaust fuel outlet. Preferably, each fuel cell comprises (in order) a metal interconnect plate, a metal spacer layer, a metal substrate, and anode, electrolyte and cathode layers mounted upon said metal substrate.

Preferably, the fuel flow path from the fuel inlet to the exhaust fuel outlet is internally manifolded, i.e. is manifolded within the at least one fuel cell stack. Preferably, the oxidant flow path from the oxidant inlet to the exhaust oxidant outlet is externally manifolded, i.e. is manifolded external to the at least one fuel cell stack. More preferably, it is manifolded external to the at least one fuel cell stack, and internal to the fuel cell stack assembly. More preferably, a volume is defined between the base plate, the end plate, the skirt, and the at least one fuel cell stack. Such a volume can be considered to be an oxidant manifolding volume.

As is detailed below, in a fuel cell stack comprising a plurality of such fuel cell stack layers the at least one electrically insulating compression gasket of a first layer is sandwiched between the metal substrate of the first layer and the metal interconnect plate of an adjacent second fuel cell stack layer.

Preferably, the compressive load on the at least one fuel cell stack is at least 0.5 kN.

Preferably the compressive load on each at least one electrically insulating compression gasket is at least 15 MPa per square centimetre (i.e. 15 MPa·cm^−2) at room temperature and pressure (RTP). More preferably, the compressive load at RTP is at least 25 kN, more preferably at least 30 kN, more preferably between 30 and 40 kN, more preferably between 30 and 35 kN.

In step (a) (the assembly step), a fuel cell stack is assembled using a conventional methodology e.g. as per prior art publications such as WO2015/136295, albeit without the tie-bars.

Preferably, step (a) further comprises inserting at least one electrically insulating gasket (e.g. a mica gasket) located between an outer surface of said at least one fuel cell stack and an adjacent inner surface of the skirt. This is particularly preferable in embodiments where the oxidant flow path from the oxidant inlet to the exhaust oxidant outlet is externally manifolded.

A preferable electrically insulating compression gasket material is vermiculite, more preferably Thermiculite, more preferably Thermiculite 866. A preferable electrically insulating gasket material is mica.

Preferably at step (b) the compressive force is exerted through the base plate, the end plate and the at least one fuel cell stack using compression means. Thus, after assembling the base plate, at least one fuel cell stack and the end plate at step (a), compressive force can then be exerted.

Preferably, the skirt comprises a plurality of skirt sections. More preferably, the skirt comprises first and second skirt sections. Preferably each skirt section has a generally U-shaped cross-section and is elongate perpendicular to the generally U-shaped cross-section, i.e. is arched or vault-shaped, more particularly barrel-vault shaped. Preferably the generally U-shaped cross-section is complimentary to, i.e. is shaped to receive, part of the assembled metal base plate, at least one fuel cell stack, and metal end plate, i.e. part of each of the metal base plate, at least one fuel cell stack, and metal end plate.

Thus, with a longitudinal direction being defined between the base plate and the end plate, each at least one fuel cell stack layer extends perpendicular to the longitudinal direction, and the U-shaped cross section of each skirt section is perpendicular to the longitudinal direction.

Thus, the first skirt section is attached to (and between) the base plate and the end plate, and similarly the second skirt section is attached to (and between) the base plate and the end plate.

Thus, a volume is defined between the base plate, the end plate and the skirt (be that a skirt having a single skirt section or a plurality of skirt sections), within which is contained the at least one fuel cell stack. Thus, the skirt surrounds the at least one fuel cell stack.

The skirt is preferably attached to the base plate and the end plate by way of welding. Preferably, the welding is fillet welding, more particularly by TIG welding. Other types of welding may also be performed, e.g. laser lap welding and brazing.

Where the skirt comprises a plurality of skirt sections, preferably the skirt sections are welded together. Again, preferably the welding is fillet welding. More preferably, welding (e.g. fillet welding) is performed using TIG welding. Other types of welding may also be performed e.g. laser klap welding, and brazing. The skirt (or each skirt section) may be made up of different sections and materials in the longitudinal direction (i.e. perpendicular to the U-shaped cross section of each skirt section). Such sections and materials may be chosen for cost and/or CTE design reasons.

In certain embodiments, assembly step (a) comprises assembling at least two fuel cell stacks. Preferably, fuel cell stacks are assembled in back-to-back pairs with suitably located power take-offs (end poles).

Thus, for example, in one embodiment first and second fuel cell stacks are provided, wherein each fuel cell stack layer comprising a single fuel cell, the fuel cell stacks arranged back-to-back. Thus, the fuel cell stack assembly comprises (in order) a base plate, a first fuel cell stack, a second fuel cell stack (oriented in reverse to the first fuel cell stack), and an end plate. By arranging the first and second fuel cell stacks in a back-to-back manner, a single positive power take-off plate can be provided between the first and second fuel cell stacks, and a first negative power take off plate can be provided at the end the first fuel cell stack adjacent the base plate, and a second negative power take off plate can be provided at the end of the second fuel cell stacks adjacent the end plate.

This back-to-back configuration (see e.g. Embodiment 3) wherein a fuel cell stack assembly comprises a number of individual fuel cell stacks enables each of the fuel cell stacks to operate at a defined voltage (and/or power output) that is less than the voltage and/or power output of a single fuel cell stack containing the same total number of fuel cell stack layers. In particular, this is useful in providing a parallel electrical arrangement and constraining (i.e. limiting) voltage (as compared to a series arrangement) and increasing power output (as compared to a series arrangement). In this way, it is possible to efficiently package in a single fuel cell stack assembly a number of fuel cell stacks that each operate at, or less than, for instance, 60V. This is particularly useful, for example, in automotive applications where regulations and design criteria pose additional requirements upon voltage levels over 60V. For example, such a fuel cell stack assembly may have an output electrical voltage of 48V.

In another embodiment, a single fuel cell stack is provided, each fuel cell stack layer comprising first and second fuel cells.

In another embodiment, first and second fuel cell stacks are provided, each fuel cell stack layer comprising first and second fuel cells.

In another embodiment, first, second, third and fourth fuel cell stacks are provided. More preferably, each fuel cell stack layer in such an arrangement comprises first and second fuel cells.

Preferably, such an arrangement comprises two pairs of fuel cell stacks—the first and second fuel cell stacks forming a first pair, and the third and fourth fuel cell stacks forming a second pair. A positive power take-off plate is provided between the first and second fuel cell stacks, and an additional positive power take-off plate is provided between the third and fourth fuel cell stacks. A negative power take off plate is provided between the first and second pairs of fuel cell stacks, i.e. between the second and third fuel cell stacks.

Preferably, the base plate and the end plate are electrically isolated or insulated from the at least one fuel cell stack. Preferably, an electrically insulating compression gasket (e.g. Thermiculite 866) is located between the base plate and the at least one fuel cell stack, and an electrically insulating compression gasket is located between the end plate and the at least one fuel cell stack.

According to the present invention, there is further provided a method of forming a metal supported solid oxide fuel cell stack assembly comprising the steps of:
(a) assembling:
  (i) a metal base plate;
  (ii) an at least one fuel cell stack mounted on the base plate; and
  (iii) a metal end plate;
  each at least one fuel cell stack arranged mounted between said base plate and said end plate, and comprising at least one fuel cell stack layer, each at least one fuel cell stack layer comprising at least one fuel cell and at least one electrically insulating compression gasket,
(b) applying a first compressive force through the at least one fuel cell stack;
(c) attaching a skirt to and between the base plate and the end plate to enclose the at least one fuel cell stack; and
(d) removing the first compressive force, whereby a compressive load (e.g. a second compressive force) on the at least one fuel cell stack is maintained through tensile forces in the skirt.

Also provided according to the present invention is a fuel cell stack assembly manufactured according to the method of the present invention.

Also provided according to the present invention is a metal supported solid oxide fuel cell stack assembly comprising:
(i) a metal base plate;
(ii) an at least one fuel cell stack mounted on the base plate; and
(iii) a metal end plate;
each at least one fuel cell stack arranged mounted between said base plate and said end plate, and comprising at least one fuel cell stack layer, each at least one fuel cell stack layer comprising at least one fuel cell and at least one electrically insulating compression gasket,
characterised in that a skirt is attached to and between the base plate and the end plate to enclose the at least one fuel cell stack and is under tension to and between the base plate and the end plate to maintain a compressive force through the at least one fuel cell stack.

Unless the context dictates otherwise, the aspects and features of the method of the present invention apply equally to the product, and vice versa.

With regard to the compressive force that is maintained, by forming/manufacturing the metal supported solid oxide fuel cell stack assembly using the method of the present invention, compressive force is exerted during the manufacturing process, and in the final product the skirt (attached to and between the base plate and the end plate) maintains that compressive force through the at least one fuel cell stack.

Thus, preferably the skirt has a coefficient of thermal expansion greater than the coefficient of thermal expansion of the at least one fuel cell stack, the solid oxide fuel cell stack assembly additionally comprising at least one expansion plate located between the base plate and the end plate, the at least one expansion plate having a coefficient of thermal expansion greater than that of the skirt. Preferably, the skirt has a CTE greater than that of the base plate and the end plate. Preferably, the skirt has a CTE greater than the overall CTE of the base plate, the at least one fuel cell stack, and the end plate.

Preferably, an at least one expansion plate is in contact with or attached to the base plate or the end plate. Preferably, an expansion plate is in contact with or attached to the end plate.

Thus, preferably the metal supported solid oxide fuel cell stack assembly further comprises at least one electrically insulating gasket located between an outer surface of said at least one fuel cell stack and an adjacent inner surface of said skirt.

Preferably, each at least one fuel cell stack is in electrical contact with end poles (power take-offs), and wherein said base plate and said end plate are electrically isolated from said at least one fuel cell stack. Thus, for example, in a first embodiment first and second fuel cell stacks are provided, wherein each fuel cell stack layer comprises a single fuel cell, the fuel cell stacks arranged back-to-back. Thus, the fuel cell stack assembly comprises (in order) a base plate, a first fuel cell stack, a second fuel cell stack (oriented in reverse to the first fuel cell stack), and an end plate. By arranging the first and second fuel cell stacks in a back-to-back manner, a single positive power take-off plate can be provided between the first and second fuel cell stacks, and a first negative power take off plate can be provided at the end the first fuel cell stack adjacent the base plate, and a second negative power take off plate can be provided at the end of the second fuel cell stacks adjacent the end plate. Preferably, electrically insulating compression gaskets located between the base plate and the at least one fuel cell stack, and between the end plate and the at least one fuel cell stack, provide electrical isolation of the base plate and the end plate from the at least one fuel cell stack.

Unless the context dictates otherwise, the words "comprise", "comprises", "comprising" and the like are to be interpreted in an inclusive, rather than exhaustive sense i.e. the sense of "including, but not limited to". The terms do include embodiments in which no further components are present.

The "exhaust oxidant outlet" and the oxidant flowing through it can also be referred to as a "cathode off-gas". Similarly, the "exhaust fuel outlet" and the exhaust fuel flowing through it can be referred to as an "anode off-gas"

Particular and preferred aspects of the invention are set out in the accompanying independent claims. Combinations of features from the dependent claims may be combined with features of the independent claims as desired and appropriate and not merely as explicitly set out in the claims.

The various figures below show fuel cell stack assemblies in a vertical orientation. Other orientations such as a horizontal orientation are equally applicable.

An enabling disclosure of the present invention, to one of ordinary skill in the art, is provided herein. Reference now will be made in detail to embodiments of the invention, one or more examples of which are set forth below. Each example is provided by way of explanation of the invention, not limitation of the invention. Of the figures.

A list of the reference signs used herein is given at the end of the specific embodiments. Repeat use of reference symbols in the present specification and drawings is intended to represent the same or analogous features or elements.

EMBODIMENT 1

Figure 1:
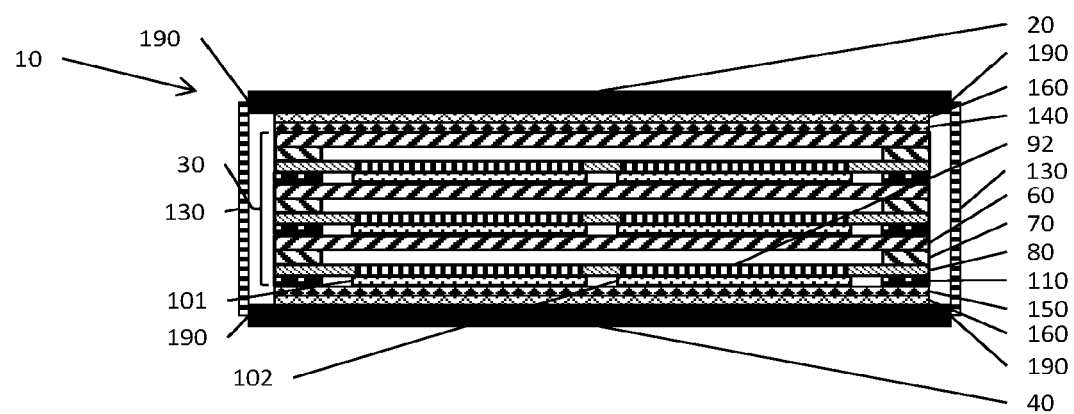
FIG. 1 shows a section through a solid oxide fuel cell stack assembly of Embodiment 1.

In this embodiment, solid oxide fuel cell stack assembly 10, as shown in FIG. 1, comprises metal base plate 20 on which is mounted fuel cell stack 30, and metal end plate 40. Fuel cell stack 30 comprises a plurality of fuel cell stack layers 50.

Negative power take off plate 140 is located between base plate 20 and fuel cell stack 30, and positive power take off plate 150 is located between fuel cell stack 30 and end plate 40.

Thermiculite gasket 160 (made of Thermiculite 866; an electrically insulating compression gasket) is located between negative power take off plate 140 and base plate 20. An additional Thermiculite gasket 160 is located between positive power take off plate 150 and end plate 40.

Figure 2:
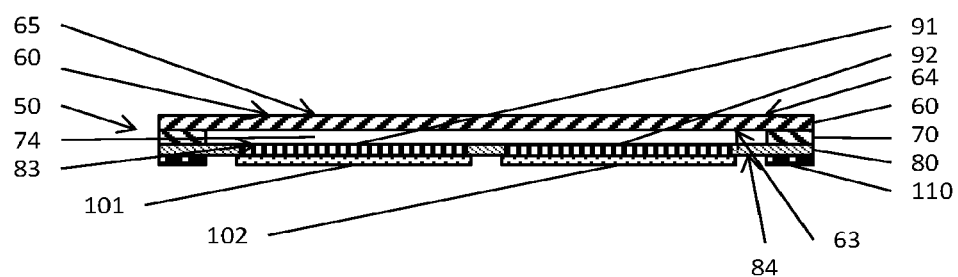
FIG. 2 shows a section through a fuel cell stack layer of FIG. 1.

Each fuel cell stack layer 50, as shown in FIG. 2, comprises metal interconnect plate 60 on which is mounted metal spacer 70, and metal substrate 80.

Metal substrate 80 has laser-driller perforated (porous) regions 91, 92, and first and second fuel cells 101, 102 deposited over porous regions 91, 92 respectively.

Each fuel cell 101, 102 comprises an anode layer deposited onto porous region 91, 92 (respectively), an electrolyte layer deposited over the anode layer, and a cathode layer deposited over the electrolyte layer.

Figure 9:
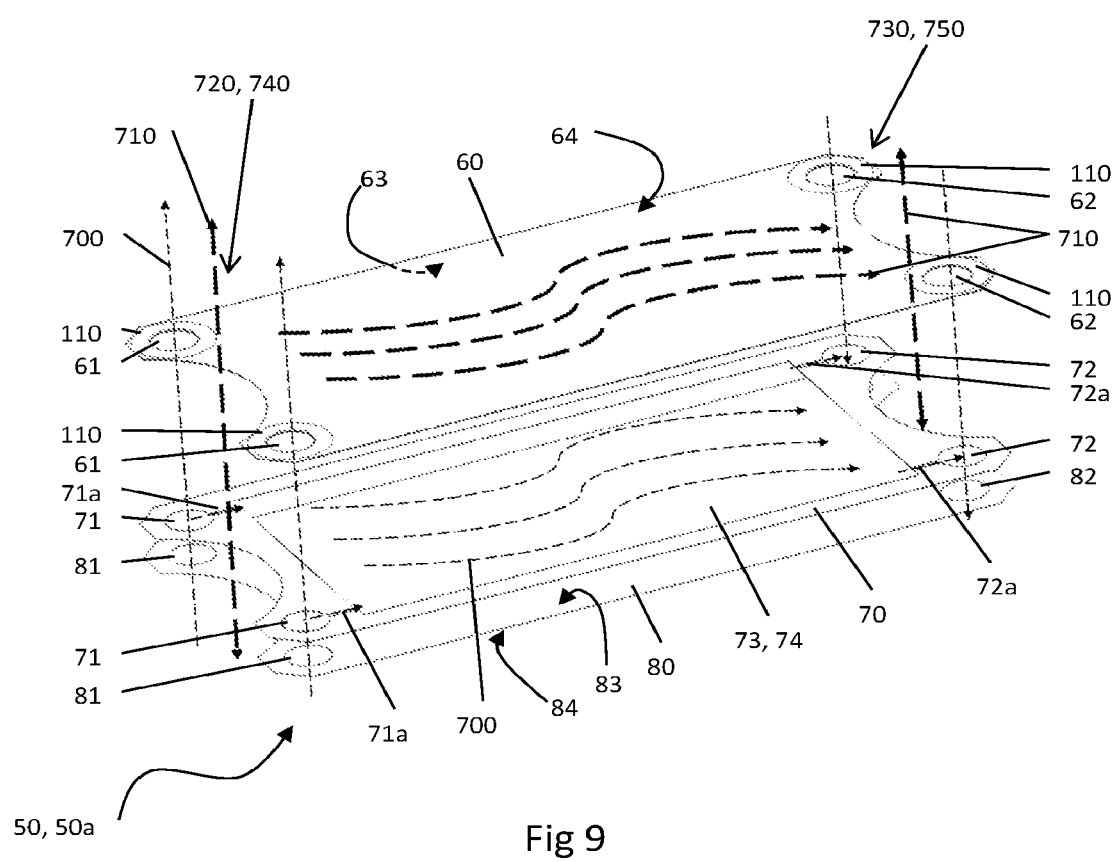
FIG. 9 shows an exploded perspective view of a fuel cell stack layer with fuel and oxidant (air) flows.
Figure 10:
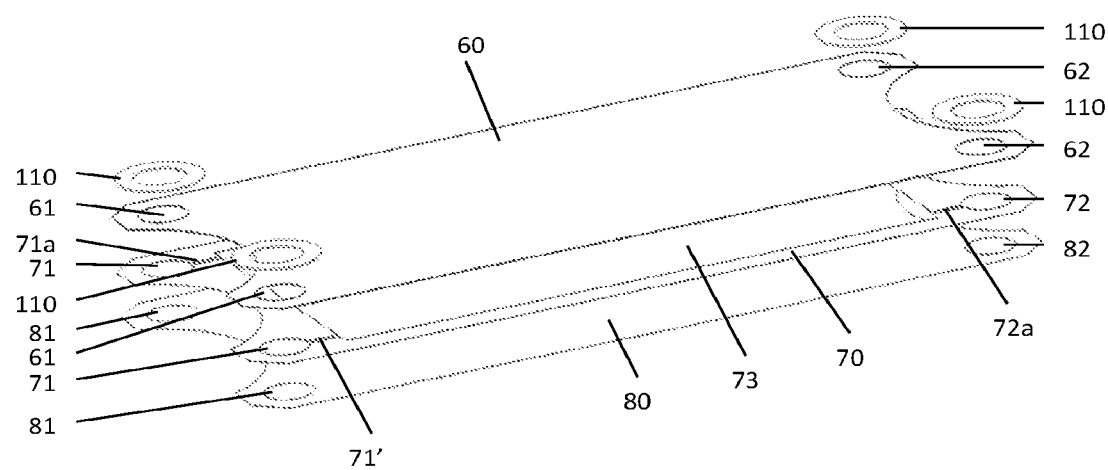
FIG. 10 shows an exploded perspective view of the fuel cell stack layer of FIG. 9.

As shown in FIGS. 9 and 10, metal interconnect plate 60 is shaped to define fuel flow orifices 61, 62. Metal spacer 70 is shaped to define fuel flow orifices 71, 72. Metal substrate 80 is shaped to define fuel flow orifices 81, 82. Metal spacer 70 is further shaped to define fuel flow space 73, and to define openings 71a and 72a between fuel flow orifices 71, 72 and fuel flow space 73.

With metal spacer 70 sandwiched between metal interconnect plate 60 and metal substrate 80, a fuel flow void 74 corresponding to fuel flow space 73 is thus defined between first (inner) surface 63 of metal interconnect plate 60, first (inner) surface 83 of metal substrate 80, and metal spacer 70. First (inner) surface 63 of metal interconnect plate 60 has dimples extending towards first (inner) surface 83 of metal substrate 80. These dimples in-use assist in fluid flow within fuel flow void 74 and in maintaining fuel flow void 74 when fuel cell stack 30 is under compressive load.

Fuel cells 101, 102 are deposited onto the second (outer) surface 84 of metal substrate 80.

Thermiculite gaskets (electrically insulating compression gaskets) 110 are positioned on second (outer) surface 84 of metal substrate 80 around fuel flow orifices 81, 82.

Each fuel cell stack layer 50 thus defines a fuel flow path (a fluid flow path) between fuel flow orifices 61, 71, 81, openings 71a, fuel flow space 73, openings 72a, and fuel flow orifices 62, 72, 82.

Orifices 61, 71, 71a and 81 are fuel inlet orifices/openings, and define a fuel inlet of fuel cell stack layer 50 and a fuel inlet side (or end) to fuel cell stack layer 50. Orifices 62, 72, 72a and 82 are exhaust fuel outlet orifices/openings, and define an exhaust fuel outlet of fuel cell stack layer 50 and an exhaust fuel outlet side (or end) to fuel cell stack layer 50.

The light dashed arrows 700 in FIG. 9 illustrate a fuel fluid flow path. The heavy dashed lines 710 in FIG. 9 illustrate an oxidant (air) fluid flow path.

Second (outer) surface 64 of metal interconnect plate 60 comprises a plurality of outwardly extending dimples 65. As fuel cell stack layers 50 are stacked together, the metal interconnect plate 60 of a first fuel cell stack layer contacts the Thermiculite gaskets 110 and (by way of outwardly extending dimples 65) the cathode layers of first fuel cell 101 and second fuel cell 102. The arrangement of Thermiculite gaskets 110 and outwardly extending dimples 65 results in an oxidant flow path being defined between the metal interconnect plate 60 of a first fuel cell stack layer 50 and the metal substrate 80 of an adjacent second fuel cell stack layer 50. This oxidant flow path is externally manifolded. Thus, each fuel cell stack layer 50 has an externally manifolded oxidant inlet and outlet.

Figure 12:
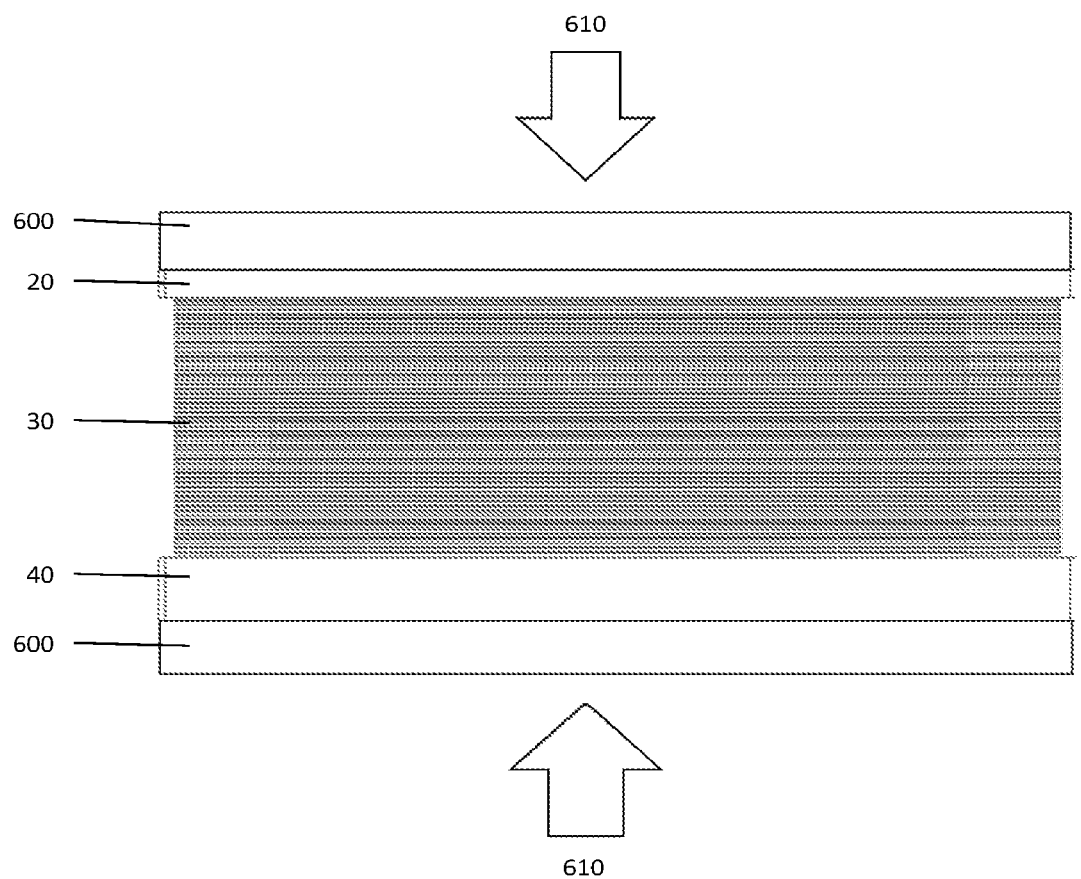
FIG. 12 illustrates a step in the manufacture of a fuel cell stack assembly.
Figure 13:
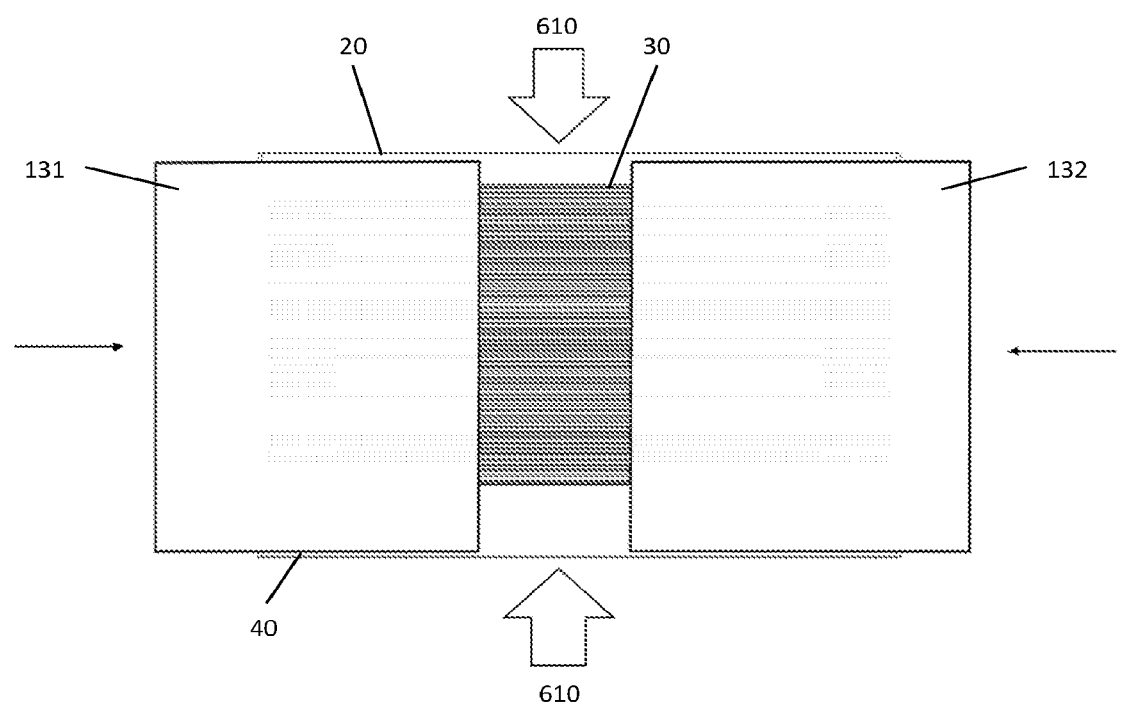
FIG. 13 illustrates a step in the manufacture of a fuel cell stack assembly.

With fuel cell stack 30 arranged mounted between metal base plate 20 and metal end plate 40, compression means 600 (FIG. 12) is used to exert compressive force on fuel cell stack 30 between metal base plate 20 and metal end plate 40, i.e. they are compressed by compression means 600. Mica gaskets 120 (electrically insulating gaskets) are then placed along the sides of fuel cell stack 20. First skirt half 131 and second skirt half 132 are then placed around the base plate 20 (FIG. 13), fuel cell stack assembly 30, end plate 40, and mica gaskets 120. Each of first skirt half 131 and second skirt half 132 are then fillet welded using TIG welding to metal base plate 20 and metal end plate 40 at weld points 190. First skirt half 131 and second skirt half 132 are then fillet welded together to define skirt 130. Thus, a volume is defined between base plate 20, end plate 40 and skirt 130, within which is contained fuel cell stack 30.

Compression means 600 is arranged such that it applies compressive force around the edges (i.e. around the perimeter) of metal base plate 20 and metal end plate 40 in order to reduce or minimise the bowing of fuel cell stack layers 50. With first skirt half 131 and second skirt half 132 welded to metal base plate 20 and metal end plate 40 (i.e. welded around metal base plate 20 and metal end plate 40), this compression around the edges is maintained when compression means 600 is removed.

Figure 14:
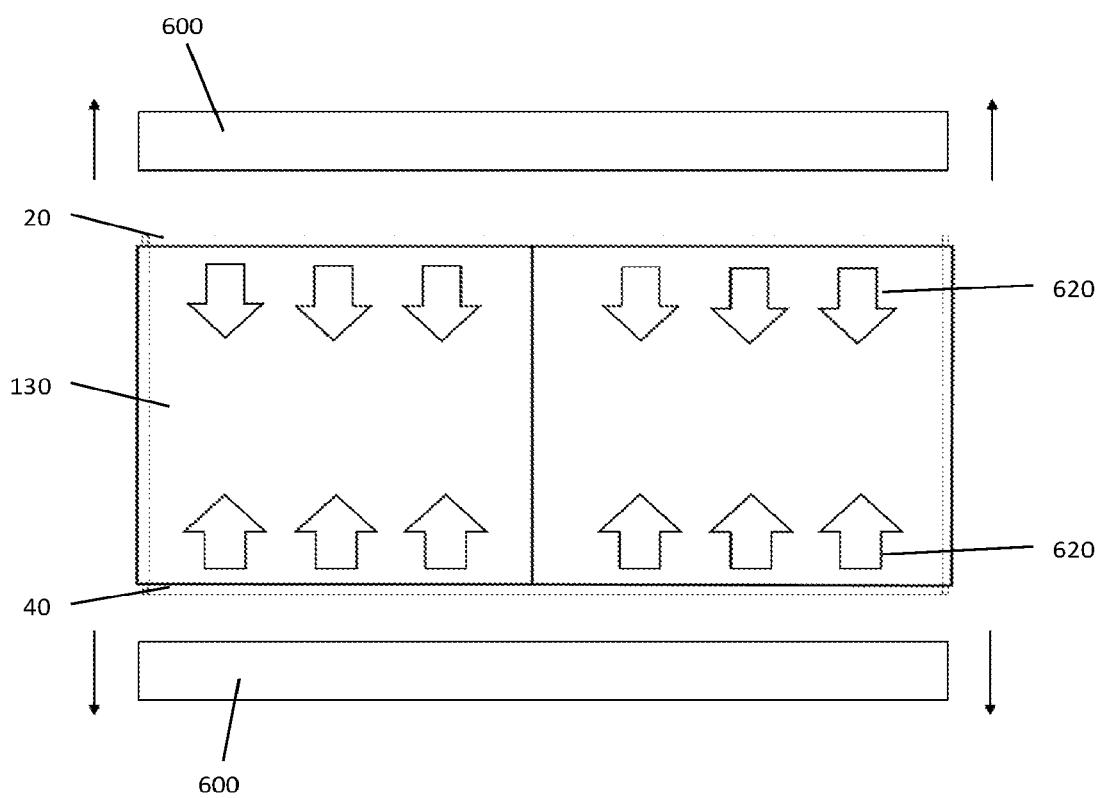
FIG. 14 illustrates a step in the manufacture of a fuel cell stack assembly.
Figure 15:
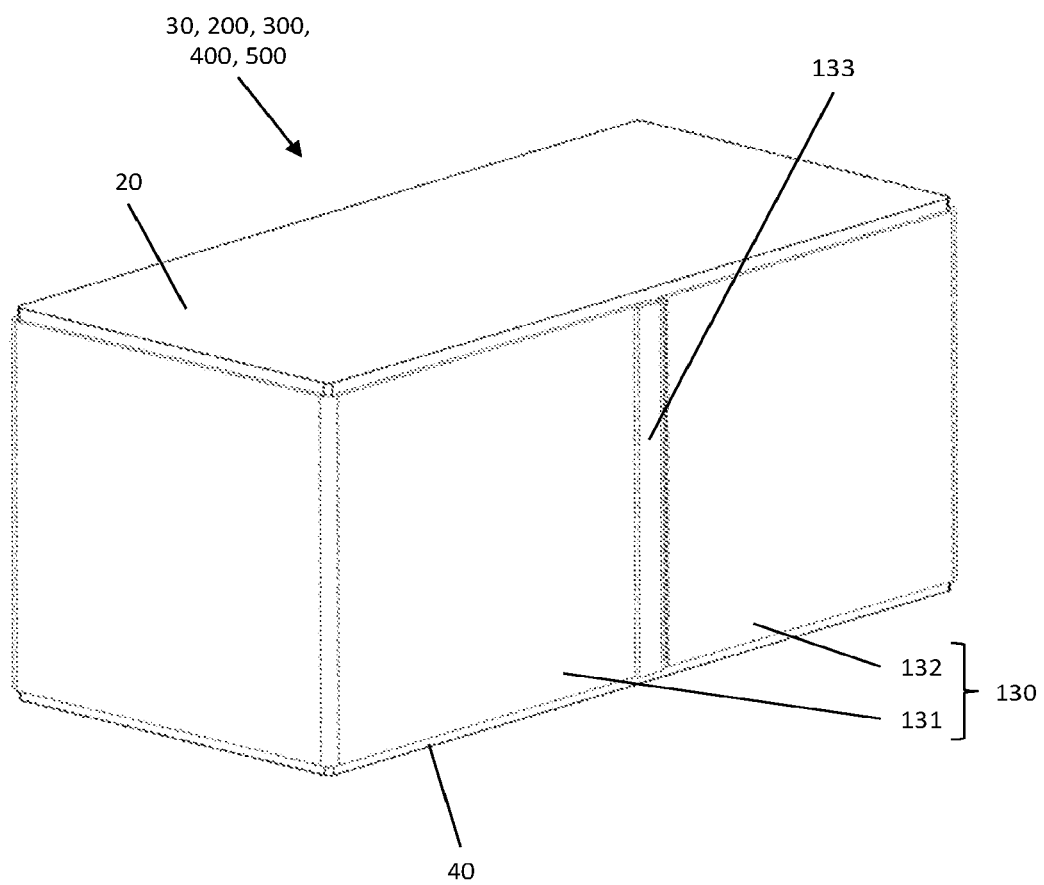
FIG. 15 is a perspective view of a completed fuel cell stack assembly.

Compression means 600 is then removed (FIG. 14), and the compressive load on fuel cell stack 30 is maintained through the tensile forces in skirt 130. Thus, the use of tie-bars is not required to effect compression of the fuel cell stack assembly 10. This reduces thermal mass and improves performance of fuel cell stack assembly 10 as compared to a corresponding fuel cell stack assembly incorporating tie-bars. By not having tie-bars, the surface area of metal substrate 80 available onto which fuel cells can be deposited is increased, thus allowing for further increase in performance as compared to a corresponding fuel cell stack assembly incorporating tie-bars.

In use, fuel cell stack assembly 10 can be readily configured to operate in a co-flow (FIG. 9) or counter-flow manner.

EMBODIMENT 2

Figure 3:
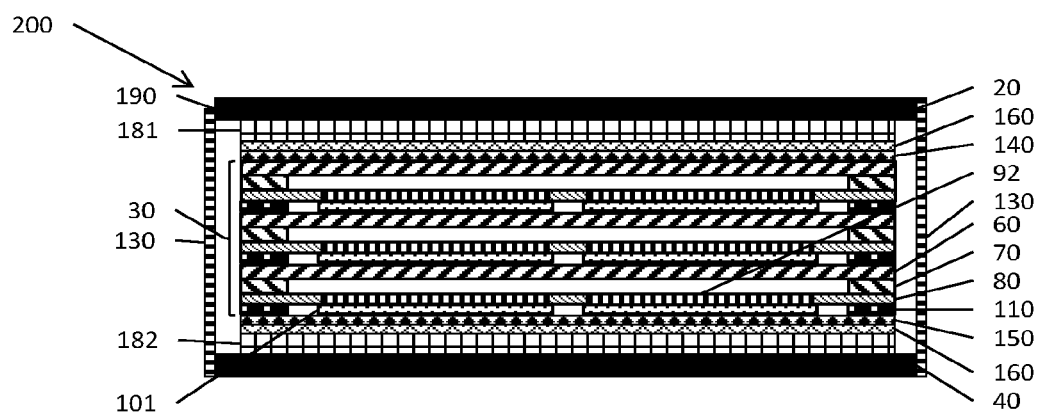
FIG. 3 shows a section through a solid oxide fuel cell stack assembly of Embodiment 2.

In this embodiment (see FIG. 3), construction and assembly of solid oxide fuel cell stack assembly 200 is generally as per the first embodiment. However, solid oxide fuel cell stack assembly 10 additionally comprises expansion plates 181, 182. A first expansion plate 181 is located between base plate 20 and Thermiculite gasket 160, and a second expansion plate 182 is located between end plate 40 and Thermiculite gasket 160.

Materials used in the various embodiments detailed herein are shown in Table 1 below:

TABLE 1

| Element | Material | CTE @ 650 Deg C. (μm/(m · ° C.)) |
| --- | --- | --- |
| base plate 20 | ferritic stainless steel 3CR12 | 11.9 |
| end plate 40 | ferritic stainless steel 3CR12 | 11.9 |
| metal interconnect plate 60 | ferritic stainless steel, grade 441 | 10.5 |
| metal spacer 70 | ferritic stainless steel, grade 441 | 10.5 |
| metal substrate 80 | Crofer 22 APU (VDM Metals GmbH) | 11.4 |
| Thermiculite gasket 110 | Thermiculite 866 (Flexitallic Ltd., UK) | 8.04 |
| mica gasket 120 | mica | 8.7 |
| skirt 130 | ferritic stainless steel, grade 441 | 10.5 |
| Thermiculite gasket 160 | Thermiculite 866 | 8.04 |
| expansion plate 181 | austentic stainless steel 316 | 18 |
| expansion plate 182 | austentic stainless steel 316 | 18 |

As can be seen from Table 1, the CTE (coefficient of thermal expansion) of the various components differs significantly. As a result of the at least one electrically insulating compression gasket (Thermiculite gasket 110) present in each fuel cell stack layer 50, the CTE value of skirt 130 is greater than that of fuel cell stack layer 50. The end result is that as the temperature of the fuel cell stack assembly increases, expansion of skirt 130 (between base plate 20 and end plate 40) is greater than expansion of fuel cell stack 30 and other components assembled between base plate 20 and end plate 40 (in particular Thermiculite gaskets 160 and Thermiculite gaskets 110), i.e. there is a differential in thermal expansion. This results in a decrease in compressive force exerted upon fuel cell stack 30 as the temperature of fuel cell stack assembly 10 increases.

In this embodiment, expansion plates 181, 182 reduce this decrease in compressive force, and thus enhance performance of the fuel cell stack assembly 200.

Expansion plates 181, 182 have a CTE greater than that of skirt 130 (and greater than that of base plate 20 and end plate 40), and are sized to compensate for the differential thermal expansion. Expansion plates 181, 182 are sized according to the number of fuel cell stack layers 50 in fuel cell stack assembly 200. This approach to sizing/dimensioning of expansion plates is generally applicable to all embodiments of the present invention.

EMBODIMENT 3

Figure 4:
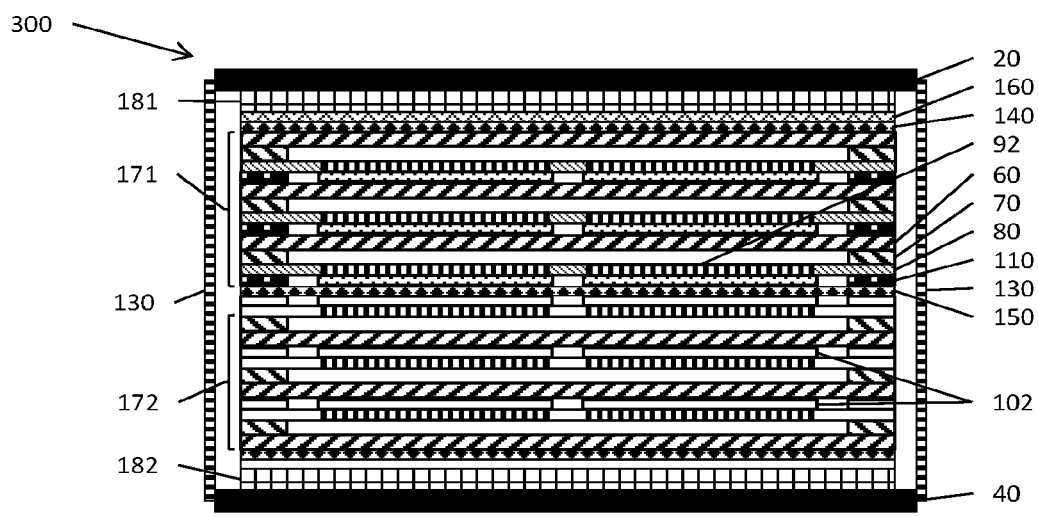
FIG. 4 shows a section through a solid oxide fuel cell stack assembly of Embodiment 3.

In this embodiment (see FIG. 4), solid oxide fuel cell stack assembly 300 comprises a back-to-back arrangement of first and second fuel cell stacks 171, 172. Construction and assembly is generally as per the second embodiment. However, in the first embodiment positive power take off plate 150 contacts Thermiculite gasket 160, i.e. is sandwiched between:
(a) first fuel cell 101, second fuel cell 102 and Thermiculite gaskets 110 of a fuel cell stack layer 50, and
(b) Thermiculite gasket 160.

Instead, in this second embodiment positive power take off plate 150 is sandwiched between:
(a) first fuel cell stack 171, and
(b) second fuel cell stack 172.

Thus, positive power take off plate 150 is sandwiched between:
(a) first fuel cell 101, second fuel cell 102 and Thermiculite gaskets 110 of a fuel cell stack layer 50 of first fuel cell stack 171, and
(b) first fuel cell 101, second fuel cell 102 and Thermiculite gaskets 110 of a fuel cell stack layer 50 of second fuel cell stack 172.

This arrangement provides the advantage of a larger power output within the same assembly design and compression process.

EMBODIMENT 4

Figure 5:
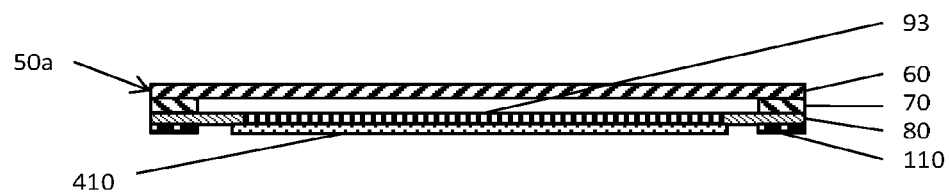
FIG. 5 shows a section through a fuel cell stack layer of Embodiment 4.
Figure 6:
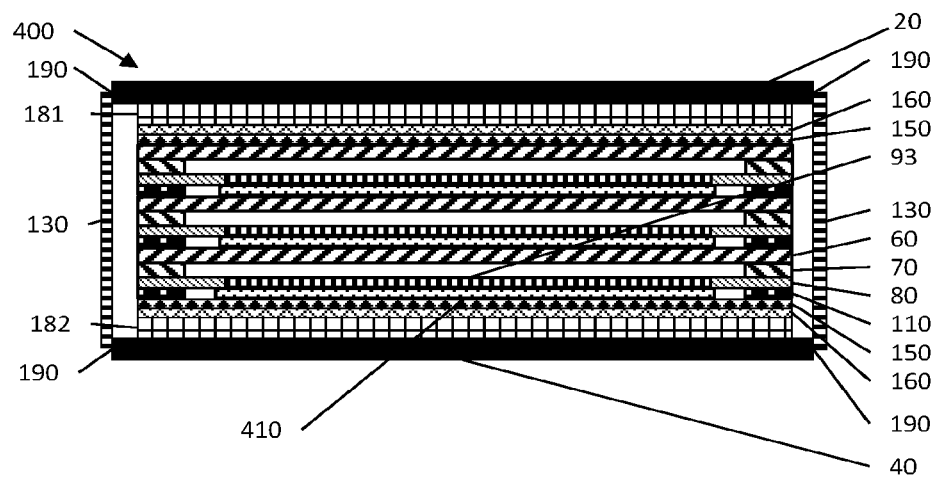
FIG. 6 shows a section through a solid oxide fuel cell stack assembly of Embodiment 4.

In this embodiment (see FIGS. 5-7), construction and assembly of solid oxide fuel cell stack assembly 400 is generally as per Embodiment 2. However, instead of each fuel cell stack layer 50a comprising first and second fuel cells (101, 102 respectively in Embodiment 2), each fuel cell stack layer 50a comprises a single fuel cell 410.

Figure 7:
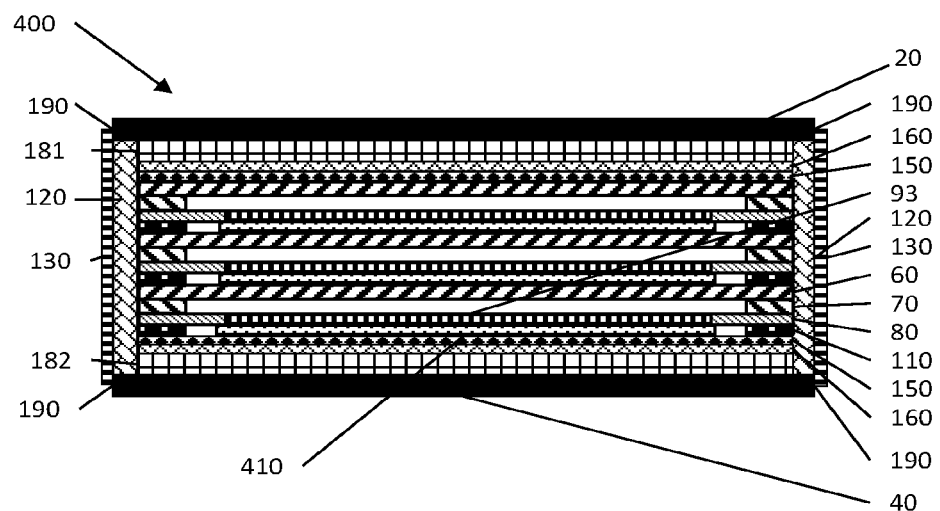
FIG. 7 shows a section perpendicular to the section of FIG. 6 through a solid oxide fuel cell stack assembly of Embodiment 4.

FIG. 7 (illustrating this embodiment) shows mica gaskets 120 which are used to electrically insulate the side of fuel cell stacks (30, 171, 172) in the various embodiments of the present invention from the adjacent inner surface of skirt 130. Mica gaskets 120 are thus sandwiched between skirt 130 and the fuel cell stack (30, 171, 172) and limit (or block/prevent) fluid flow between them. This assists in the external manifolding of oxidant (air) flow within the fuel cell stack assembly, and assists in defining an oxidant inlet end to the fuel cell stack assembly which is manifolded external to the at least one fuel cell stack (30, 171, 172 etc.) and internal to the fuel cell stack assembly (10, 200, 300, 40, 500). Similarly, it assists in defining an exhaust oxidant outlet end to the fuel cell stack assembly which is manifolded external to the at least one fuel cell stack (30, 171, 172 etc.) and internal to the fuel cell stack assembly (10, 200, 300, 400, 500).

EMBODIMENT 5

Figure 8:
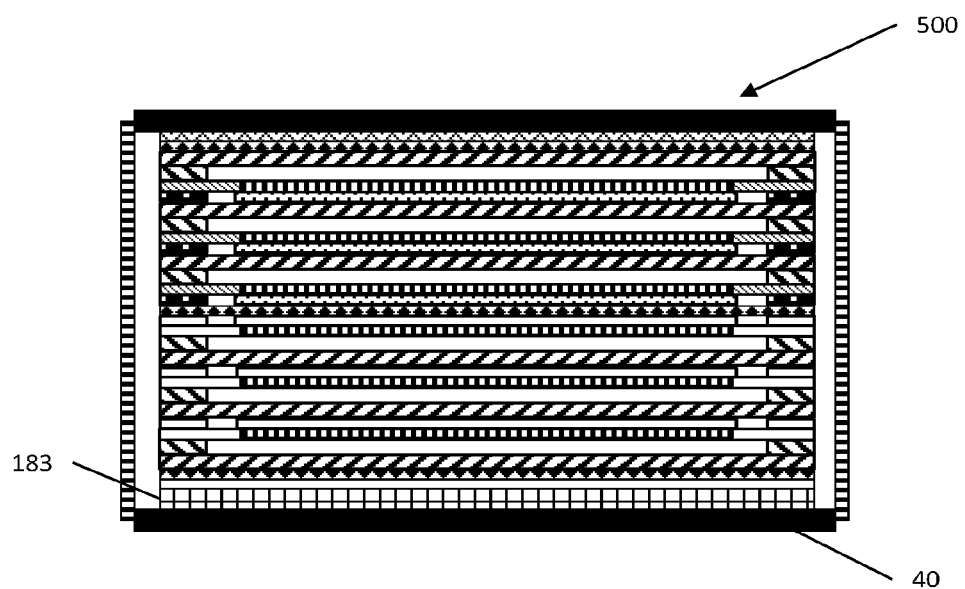
FIG. 8 shows a section through a solid oxide fuel cell stack assembly of Embodiment 5.

In this embodiment (see FIG. 8), construction and assembly of solid oxide fuel cell stack assembly 500 is generally as per Embodiment 3. However, as per Embodiment 4 each fuel cell stack layer 50a comprises a single fuel cell 410. Furthermore, only a single expansion plate 183 is provided, This expansion plate 183 is attached to metal end plate 40.

ALL EMBODIMENTS

FIGS. 9 and 10 provided exploded perspective views of fuel cell stack layers 50 and 50a and illustrates the fluid flow paths within them and within stacks of them.

Fuel fluid flow path 700 into fuel cell stack layer 50, 50a is via fuel flow orifice 81 in metal substrate 80, fuel flow orifice 71 and opening 71a in metal spacer 70 (i.e. on a fuel inlet side of the fuel cell stack layer 50, 50a) and into fuel flow void 74 defined in fuel flow space 73 between metal substrate 80, metal spacer 70 and metal interconnect plate 60, passing across first (inner) surface 83 of metal substrate 80 and first (inner) surface 63 of metal interconnect plate 60. The fuel cell/fuel cells 101, 102, 410 (depending on the embodiment) are located on second (outer) surface 84 of metal substrate 80 and fuel flow to (and the return of exhaust fuel from) the fuel cell/fuel cells is via laser-drilled perforated porous region 91, 92, 93 (depending on the embodiment).

Exhaust fuel exits fuel cell stack layer 50, 50a via opening 72a and fuel flow orifice 72 in metal spacer 70, and fuel flow orifices 82 in metal substrate 80 (i.e. on an exhaust fuel outlet side of fuel cell stack layer 50, 50a).

Orifices 61, 62 in metal interconnect plate 60 and Thermiculite gaskets 110 further extend the fluid flow path to adjacent fuel cell stack layers 50, 50a.

Fuel fluid flow path 700 is internally manifolded.

Oxidant flow path 710 is manifolded external to fuel cell stack layer 50, 50a and internal to fuel cell stack assembly 10, 200, 300, 400, 500. A volume is defined between metal base plate 20, metal end plate 40, skirt 130, and the fuel cell stack(s) 30, 171, 172 (depending on the embodiment). Oxidant flow from an oxidant inlet end of the fuel cell stack layer 50, 50a adjacent fuel flow orifices 81, 71, 61 (i.e. adjacent fuel inlet side) to an exhaust oxidant outlet end of the fuel cell stack layer 50, 50a adjacent fuel flow orifices 82, 72, 62 (i.e. adjacent exhaust fuel outlet side) is between adjacent fuel cell stack layers 50, 50a i.e. between metal interconnect plate 60 of a first fuel cell stack layer 50, 50a and metal substrate 80 of an adjacent second fuel cell stack layer 50, 50a.

Oxidant flow from the oxidant inlet end to the exhaust oxidant outlet end around the outside of fuel cell stack 30, 171, 172 (i.e. other than between) fuel cell stack layers 50, 50a) is prevented by mica gasket 120 located sandwiched between skirt 130 and fuel cell stack 30, 171, 172 from the oxidant inlet end to the exhaust oxidant outlet end.

FIG. 9 illustrates a co-flow operation of fuel and oxidant flows. Counter-flow operation is equally possible, i.e. oxidant flow is counter to fuel flow, with the oxidant inlet end of the fuel cell stack layer 50, 50a adjacent fuel flow orifices 82, 72, 62 (i.e. adjacent exhaust fuel outlet side) to an exhaust oxidant outlet end of the fuel cell stack layer 50, 50a adjacent fuel flow orifices 81, 71, 61 (i.e. adjacent fuel inlet side).

Stack Assembly Method

Figure 11:
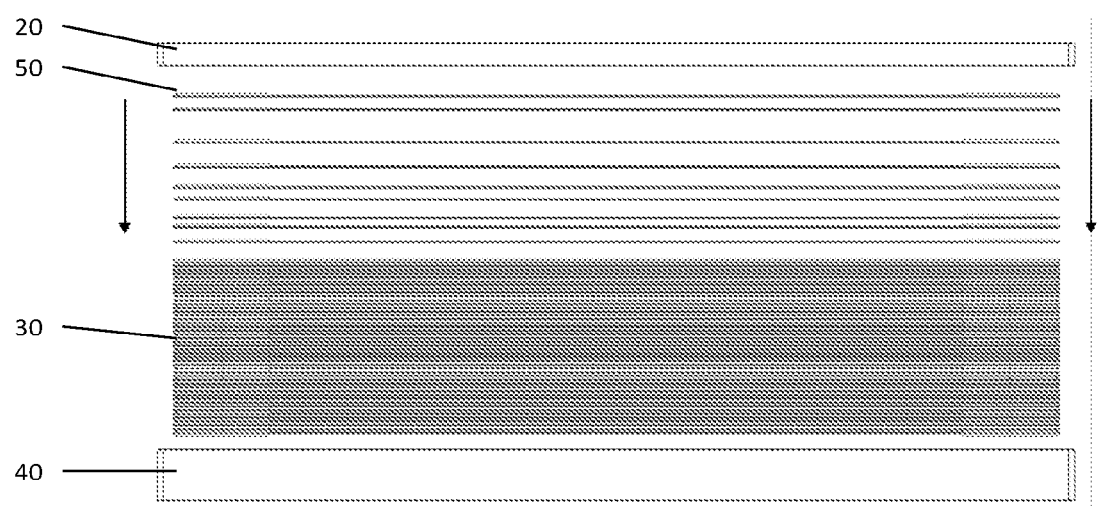
FIG. 11 illustrates a step in the manufacture of a fuel cell stack assembly.

Fuel cell stack 30 is formed (FIG. 11) by assembling fuel cell stack layers 50 upon metal end plate 40. Metal base plate 20 is then placed on top of fuel cell stack 30.

A removable compression means 600 is then used (FIG. 12) to exert compressive force 610 through end plate 40, fuel cell stack 30 and base plate 20.

With compressive force 610 still being exerted through fuel cell stack 30 (FIG. 13), skirt first half 131 and skirt second half 132 are then placed around end plate 40, fuel cell stack 30 and base plate 20.

Skirt first half 131 and skirt second half 132 are then attached to base plate 20, end plate 40 by TIG welding. Skirt first half 131 and skirt second half are also TIG welded to one another to form skirt 130 with fillet weld 133. Thus, fuel cell stack 30 is enclosed within a volume defined by base plate 20, end plate 40 and skirt 130. The TIG welding forms a gas tight seal between the skirt first half 131, skirt second half 132, base plate 20 and end plate 40.

Compression means 600 is then removed (FIG. 14) and the compressive load 610 on fuel cell stack 30 is maintained through tensile forces 620 in skirt 130, i.e. fuel cell stack 30 is under tension to and between base plate 20 and end plate 40 to maintain a compressive force through fuel cell stack 30. Reference signs are incorporated in the claims solely to ease their understanding, and do not limit the scope of the claims. The present invention is not limited to the above embodiments only, and other embodiments will be readily apparent to one of ordinary skill in the art without departing from the scope of the appended claims.

REFERENCE SIGNS

10—solid oxide fuel cell stack assembly
20—metal base plate
30—fuel cell stack
40—metal end plate
50—fuel cell stack layer
50a—fuel cell stack layer
60—metal interconnect plate
61—fuel flow orifice
62—fuel flow orifice
63—first (inner) surface of metal interconnect plate 60
64—second (outer) surface of metal interconnect plate 60
65—outwardly extending dimples
70—metal spacer
71—fuel flow orifice
71a—opening
72—fuel flow orifice
72a—opening
73—fuel flow space
74—fuel flow void
80—metal substrate
81—fuel flow orifice
82—fuel flow orifice
83—first (inner) surface of metal substrate 80
84—second (outer) surface of metal substrate 80
91—laser-drilled perforated (porous) region
92—laser-drilled perforated (porous) region
93—laser-drilled perforated (porous) region
101—first fuel cell
102—second fuel cell 110—Thermiculite gasket
120—mica gasket
130—skirt
131—skirt first half
132—skirt second half
133—fillet weld
140—negative power take off plate
150—positive power take off plate
160—Thermiculite gasket
171—first fuel cell stack
172—second fuel cell stack
181—first expansion plate
182—second expansion plate
183—expansion plate
190—weld point
200—solid oxide fuel cell stack assembly
300—solid oxide fuel cell stack assembly
400—solid oxide fuel cell stack assembly
410—fuel cell
500—solid oxide fuel cell stack assembly
600—compression means
610—compressive forces
620—tensile forces
700—fuel fluid flow path
710—oxidant fluid flow path
720—fuel inlet side
730—exhaust fuel outlet side
740—oxidant inlet side
750—exhaust oxidant outlet side

The invention claimed is:

1. A metal supported solid oxide fuel cell stack assembly comprising:
   (i) a metal base plate;
   (ii) an at least one fuel cell stack mounted on the base plate; and
   (iii) a metal end plate;
   each at least one fuel cell stack arranged mounted between said base plate and said end plate, and comprising at least one fuel cell stack layer, each at least one fuel cell stack layer comprising at least one fuel cell and at least one electrically insulating compression gasket,
   characterised in that a skirt is attached to and between the base plate and the end plate to enclose the at least one fuel cell stack and is under tension to and between the base plate and the end plate to maintain a compressive force through the at least one fuel cell stack, and
   the solid oxide fuel cell stack assembly additionally comprising at least one expansion plate located between the base plate and the end plate,
   wherein the at least one expansion plate has a coefficient of thermal expansion greater than a coefficient of thermal expansion of the skirt, and the coefficient of thermal expansion of the skirt is greater than a coefficient of thermal expansion of the at least one fuel cell stack.

2. A metal supported solid oxide fuel cell stack assembly according to claim 1, wherein the at least one electrically insulating compression gasket has a coefficient of thermal expansion lower than the coefficient of thermal expansion of the skirt.

3. A metal supported solid oxide fuel cell stack assembly according to claim 1, wherein the at least one expansion plate is located between the end plate and the adjacent fuel cell stack layer.

4. A metal supported solid oxide fuel cell stack assembly according to claim 1, wherein the at least one expansion plate is located between the base plate and the adjacent fuel cell stack layer.

5. A metal supported solid oxide fuel cell stack assembly according to claim 1, wherein there is provided a plurality of fuel stack layers, and the at least one expansion plate is located between fuel stack layers.

6. A metal supported solid oxide fuel cell stack assembly according to claim 1, wherein the skirt is a metal skirt.

7. A metal supported solid oxide fuel cell stack assembly according to claim 1, wherein the skirt is attached to and between the base plate and the end plate by welding.

8. A metal supported solid oxide fuel cell stack assembly according to claim 1, wherein the skirt, at least one fuel cell stack, and at least one expansion plate expand along a longitudinal direction defined between the base plate and the end plate, wherein the expansion plate expands in the longitudinal direction by at least 50% of the expansion of the skirt in the longitudinal direction compared to the expansion of the at least one fuel cell stack in the longitudinal direction.

9. A method of forming a metal supported solid oxide fuel cell stack assembly comprising the steps of:
   (a) assembling:
      (i) a metal base plate;
      (ii) an at least one fuel cell stack mounted on the base plate;
      (iii) an at least one expansion plate; and
      (iv) a metal end plate;
      each at least one expansion plate arranged between the base plate and the end plate, each at least one fuel cell stack arranged mounted between said base plate and said end plate, and comprising at least one fuel cell stack layer, each at least one fuel cell stack layer comprising at least one fuel cell and at least one electrically insulating compression gasket,
   (b) applying a compressive force through the at least one fuel cell stack using a compression means;
   (c) attaching a skirt to and between the base plate and the end plate to enclose the at least one fuel cell stack; and
   (d) removing the compression means so that the compressive load on the at least one fuel cell stack is maintained through tensile forces in the skirt;
   wherein the at least one expansion plate has a coefficient of thermal expansion greater than a coefficient of thermal expansion of the skirt, and the coefficient of thermal expansion of the skirt is greater than a coefficient of thermal expansion of the at least one fuel cell stack.

10. A method according to claim 9, wherein the at least one electrically insulating compression gasket has a coefficient of thermal expansion lower than the coefficient of thermal expansion of the skirt.

11. A method according to claim 9, wherein said skirt comprises a plurality of skirt sections.

12. A method according to claim 9, wherein the skirt is a metal skirt.

13. A method according to claim 9, wherein the skirt is attached to and between the base plate and the end plate by welding.

14. A method according to claim 9, wherein the at least one expansion plate is arranged between the end plate and the adjacent fuel cell stack layer.

15. A method according to claim 9, wherein the at least one expansion plate is arranged between the base plate and the adjacent fuel cell stack layer.

16. A method according to claim 9, wherein there is provided a plurality of fuel stack layers, and the at least one expansion plate is arranged between fuel stack layers.

17. A method according to claim 9, wherein the compressive force is applied through the at least one fuel cell stack using a compression means.

18. A method according to claim 9, wherein when the skirt, at least one fuel cell stack, and at least one expansion plate, expand along a longitudinal direction defined between the base plate and the end plate, the expansion plate expands in the longitudinal direction by at least 50% of the expansion of the skirt in the longitudinal direction compared to the expansion of the at least one fuel cell stack in the longitudinal direction.

* * * * *